US009400777B2

(12) United States Patent
Oshlag et al.

(10) Patent No.: US 9,400,777 B2
(45) Date of Patent: Jul. 26, 2016

(54) MANAGEMENT DATA PROCESSING SYSTEM AND METHOD

(71) Applicants: David A. Oshlag, Pittsburgh, PA (US); Justin R. Wagner, Spokane Valley, WA (US)

(72) Inventors: David A. Oshlag, Pittsburgh, PA (US); Justin R. Wagner, Spokane Valley, WA (US)

(73) Assignee: CRM Excel Template, LLC, Pittsburgh, PA (US)

( * ) Notice: Subject to any disclaimer, the term of this patent is extended or adjusted under 35 U.S.C. 154(b) by 272 days.

(21) Appl. No.: 14/066,821

(22) Filed: Oct. 30, 2013

(65) Prior Publication Data

US 2014/0173401 A1 Jun. 19, 2014

Related U.S. Application Data

(60) Provisional application No. 61/721,734, filed on Nov. 2, 2012.

(51) Int. Cl.
| G06F 3/01 | (2006.01) |
| G06F 17/24 | (2006.01) |
| G06F 3/00 | (2006.01) |

(52) U.S. Cl.
CPC ............ *G06F 17/246* (2013.01); *G06F 17/248* (2013.01)

(58) Field of Classification Search
None
See application file for complete search history.

(56) References Cited

U.S. PATENT DOCUMENTS

| 7,945,850 B2 | 5/2011 | Machalek |
| 2002/0010743 A1* | 1/2002 | Ryan ..................... G06F 17/246 709/205 |

(Continued)

OTHER PUBLICATIONS

CRMx1, An Excel based CRM system, for growing businesses, http://www.crm-on-excel.com/, 2009 (from archived webpages from 2009, see http://web.archive.org/web/20100808156I5/http:www.crm-on-excel.com/), 1 page.

(Continued)

*Primary Examiner* — Toan Vu
(74) *Attorney, Agent, or Firm* — The Webb Law Firm

(57) ABSTRACT

A data management system operating within a third-party spreadsheet application environment includes a plurality of template worksheets within the third-party spreadsheet application. The plurality of template worksheets comprise at least a dashboard interface worksheet, and at least one settings interface, generated by at least one processor, comprising at least one worksheet within the third-party spreadsheet application. The at least one settings interface further comprising a plurality of selectable settings options configured to modify at least one parameter of the dashboard interface worksheet, wherein the dashboard interface worksheet comprises a plurality of selectable dashboard options comprising at least one of the following: a choose columns to display option, an insert contact option, a delete contact option, a sort ascending option, a sort descending option, a hide averages option, a hide totals option, an import contacts option, an export contacts option, and/or a clear sorting option.

16 Claims, 13 Drawing Sheets

(56) References Cited

U.S. PATENT DOCUMENTS

| | | | |
|---|---|---|---|
| 2005/0261879 A1* | 11/2005 | Shrivastava | G06F 11/0715 702/186 |
| 2006/0064428 A1* | 3/2006 | Colaco | G06F 17/30917 |
| 2006/0080596 A1* | 4/2006 | Bhogal | G06F 9/542 715/213 |
| 2006/0112123 A1 | 5/2006 | Clark et al. | |
| 2007/0050697 A1* | 3/2007 | Lewis-Bowen | G06F 17/246 715/212 |
| 2007/0208992 A1* | 9/2007 | Koren | G06F 11/3438 715/212 |
| 2008/0201196 A1* | 8/2008 | Rowland | G06Q 10/06311 705/7.13 |
| 2009/0037241 A1* | 2/2009 | Olsen | G06Q 10/0637 705/7.36 |
| 2009/0271762 A1 | 10/2009 | Taylor et al. | |
| 2011/0016379 A1 | 1/2011 | McColl et al. | |
| 2012/0013540 A1* | 1/2012 | Hogan | G06F 3/04883 345/173 |
| 2012/0076291 A1* | 3/2012 | Bhogal | H04L 12/5805 379/216.01 |
| 2014/0095395 A1* | 4/2014 | Romney | G06Q 30/0214 705/80 |
| 2014/0108971 A1* | 4/2014 | No | G06F 8/34 715/762 |

OTHER PUBLICATIONS

Using Excel as a simple CRM, http://datanitro.com/blog/2012/07/23/Using-Excel-as-a-simple-CRM/, Jul. 23, 2012, 5 pages.
Free CRM for Excel, http://excelcrm.blogspot.com/, Sep. 1, 2012, 5 pages.
Excel Project Management Template 2.3, http://excel-project-management-template.en.softonic.com/, Oct. 24, 2012, 12 pages.
Gantt Chart Template for Excel, http://www.vertex42.com/ExcelTemplates/excel-gantt-chart.html, 2003, 7 pages.
CRM Template, http://www.vertex42.com/ExcelTemplates/crm-template.html, 2003, 2 pages.

* cited by examiner

MANAGEMENT DATA PROCESSING SYSTEM AND METHOD

CROSS REFERENCE TO RELATED APPLICATION

This application claims priority to U.S. Provisional Patent Application No. 61/721,734, filed Nov. 2, 2012, entitled "Management Data Processing System and Method," the entire disclosure of which is herein incorporated by reference.

BACKGROUND OF THE INVENTION

1. Field of the Invention

The present invention relates generally to the field of data processing, and in particular to a system, method and computer program product for customer relationship management, and/or project management data processing.

2. Description of Related Art

Customer Relationship Management (CRM), and other data management schemas, involve data-centric processes. Because these processes can be complex, a large amount of data must be managed and supervised by users, including information relating to contacts, sales, and various projects. Many existing CRM and other data management applications/tools are overly complex and are not user friendly for small companies or small business units within larger organizations. This complexity results in applications that are slow and difficult to use. Further, many data management applications focus on the metrics of closing sales instead of managing client relationships or client projects. These applications often require users to learn a new set of navigation and formatting methodologies, which may be inconvenient for many users who are only familiar with common applications, such as Microsoft Excel.

Popular data management applications host users' data for remote access, as opposed to locally storing important data on a user's hard drive. This results in recurring hosting fees or charges and requires users to have an Internet connection to retrieve their data and to perform other functions.

Therefore, there is a need for a data management tool that is user friendly and easy to navigate, that can be run locally on a variety of different platforms, and that is capable of utilizing existing applications that many users are already familiar with.

SUMMARY OF THE INVENTION

It is therefore an object of the present invention to provide a system, method, and computer program product that overcomes some or all of the deficiencies of the prior art.

According to a preferred and non-limiting embodiment, provided is a data management system operating within a third-party spreadsheet application environment, comprising: a plurality of template worksheets within the third-party spreadsheet application, the plurality of template worksheets comprising at least a dashboard interface worksheet; and at least one settings interface, generated by at least one processor, comprising at least one worksheet within the third-party spreadsheet application, the at least one settings interface further comprising a plurality of selectable settings options configured to modify at least one parameter of the dashboard interface worksheet, wherein the dashboard interface worksheet comprises a plurality of selectable dashboard options that are not part of the third-party spreadsheet application, the plurality of selectable dashboard options comprising at least one of the following: a choose columns to display option, an insert contact option, a delete contact option, a sort ascending option, a sort descending option, a hide averages option, a hide totals option, an import contacts option, an export contacts option, a clear sorting option, or any combination thereof.

According to another preferred and non-limiting embodiment, provided is a method for managing data within a third-party spreadsheet application environment, comprising: importing, into the third-party spreadsheet application environment, a plurality of template worksheets comprising at least a dashboard interface worksheet, and a plurality of software functions not provided with the third-party spreadsheet application; displaying an add contacts option on at least one template worksheet of the plurality of template worksheets, wherein the add contacts option causes the third-party spreadsheet application to display an add-contacts interface not natively provided by the third-party spreadsheet application; receiving, through the add-contacts interface, contact information for a new contact to be added; and generating a unique identifier based at least partially on a current time and at least a portion of the contact info nation.

According to a further preferred and non-limiting embodiment, provided is a computer program product for managing data within a third-party spreadsheet application, the computer program product comprising at least one non-transitory computer readable medium comprising program instructions that, when executed by at least one processor, cause the at least one processor to: import, into the third-party spreadsheet application environment, a plurality of template worksheets comprising at least a dashboard interface worksheet, and a plurality of software functions not provided with the third-party spreadsheet application; display an add contacts option on at least one template worksheet of the plurality of template worksheets, wherein the add contacts option causes the third-party spreadsheet application to display an add-contacts interface not natively provided by the third-party spreadsheet application; receive, through the add-contacts interface, contact information for a new contact to be added; and generate a unique identifier based at least partially on a current time and at least a portion of the contact information.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWING

FIG. 3 is a screenshot of a dashboard screen of a data processing system according to the principles of the present invention;

Figure 5:
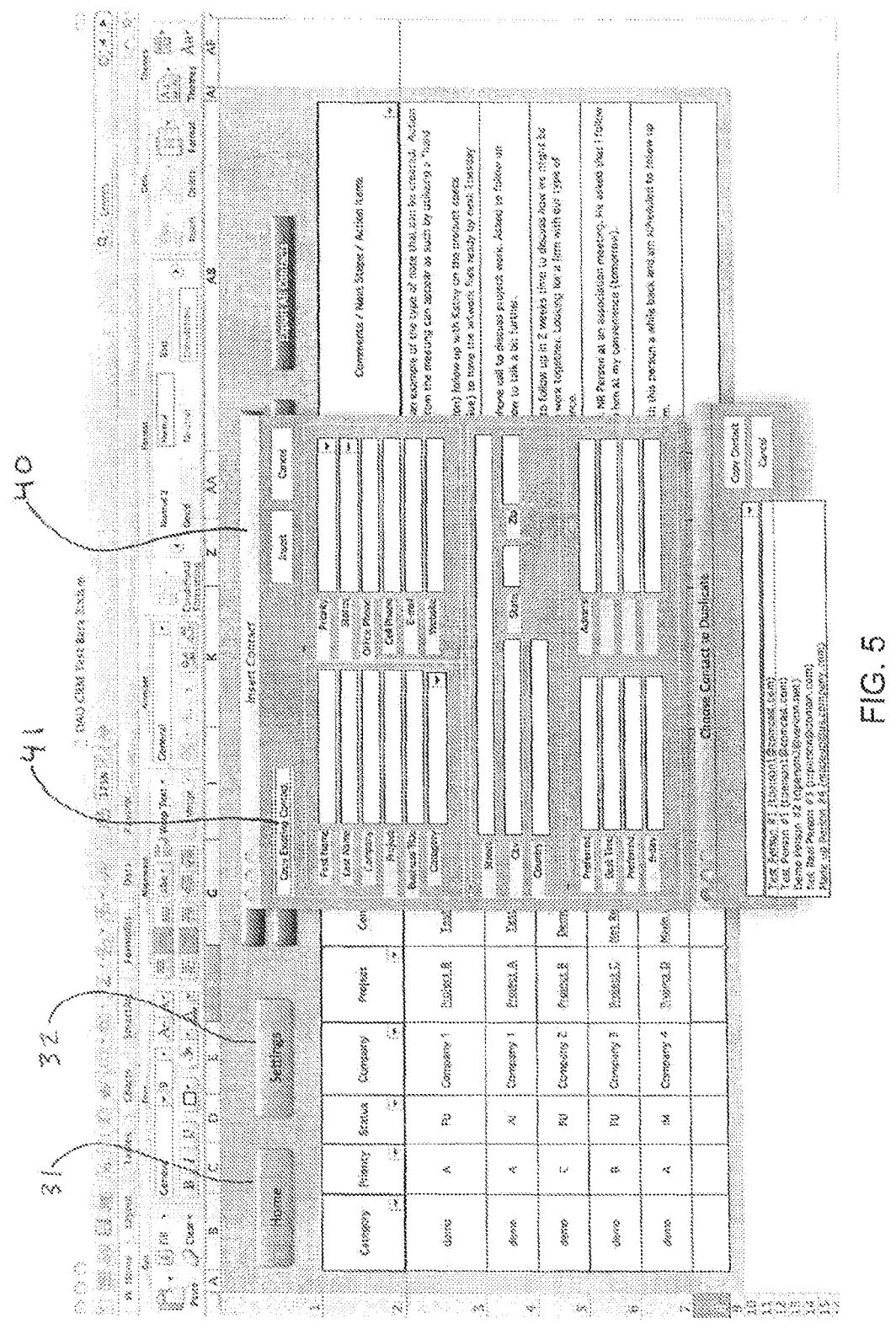

FIG. 5 is a screenshot of the dashboard screen with the insert contact dialog box and a duplicate contact dialog box of a data processing system according to the principles of the present invention;

FIG. 8 is a screenshot of a settings screen of a data processing system according to the principles of the present invention;

FIG. 11 is a screenshot of the contacts screen with a delete note dialog box of a data processing system according to the principles of the present invention;

DESCRIPTION OF THE PREFERRED EMBODIMENTS

The present invention provides a Customer Relationship and/or Project Management data processing system 1 and methods that are easy to use and optimized for smaller companies. The system 1 is capable of increasing productivity by allowing for efficient management of projects and client relationships. The invention replaces the need for project/client file folders to keep track of correspondence, and allows for quick access to historical conversations and notes in an easy to navigate and portable electronic format. The data processed with the system 1 may be locally hosted on a computer, allowing access without an Internet or network connection. Although embodiments described herein may involve CRM solutions, it will be appreciated that the present invention may be used in any number of data processing and management contexts.

The present invention may be integrated with existing applications (e.g., Microsoft Excel or other spreadsheet applications) or may be implemented as a stand-alone application. As described herein, function calls and/or macros refer to portions of source code that perform a particular function or task. In a preferred but non-limiting embodiment, the function calls may be written in Visual Basic (VB), within Microsoft Excel or other spreadsheet applications, and embedded in a particular file. In other embodiments, the function calls may be included with the source code that provides the application framework.

Figure 1:
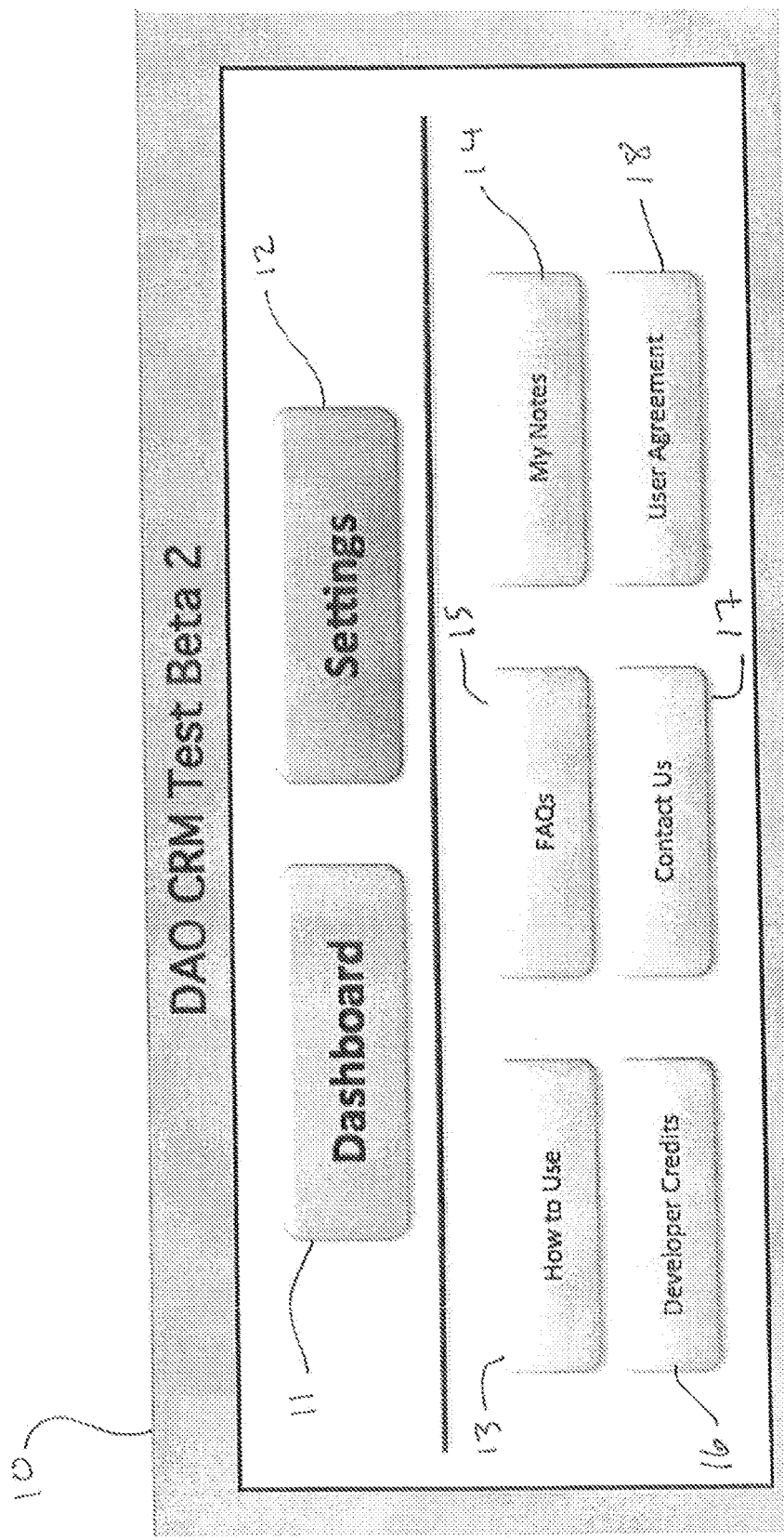
FIG. 1 is a screenshot of a home screen of a data processing system according to the principles of the present invention.

Referring now to FIG. 1, a home screen 10 of one preferred and non-limiting embodiment of the data processing system 1 of the present invention is shown that includes a "Dashboard" button 11, a "Settings" button 12, a help (or "How to Use") button 13, a "My Notes" button 14, a frequently asked questions ("FAQ") button 15, a developer credits button 16, a "Contact Us" button 17, and a "User Agreement" button 18. Clicking on the "Settings" button 12 takes the user to the Settings page 80 where they are able to easily customize the template tool to fit their particular needs. Customization options may include: Home Page Title, User Column Names, Category Names, New Contact Height, New Note Height, Background color and font styles, Status Codes and Priority Codes. In a preferred but non-limiting embodiment, the on click event associated with the "Settings" button 12 may be handled by a macro (i.e., "SettingsTab"), that switches the currently viewable worksheet to the "Settings" worksheet and remembers which page called the function to enable the "Return" button on the "Settings" page.

Still referring to FIG. 1, clicking on the "How to Use" button 13 takes the user to a page which describes in a series of sentences how to use and to become familiar with the template tool. References to the "Dashboard", "Settings" and "Home" pages are color coded (e.g., orange, blue and red, respectively) to make it easy to follow. Navigation buttons at the top of this page make it possible to return to either the Home page or the Dashboard page. For the "How to Use" button 13, the on click event may be handled by a macro (i.e., "HowToUseTab") that switches the currently viewable worksheet to the "HowToUse" worksheet. Clicking on the "FAQ" (frequently asked questions) button takes the user to a page, formatted in a question and answer style, which details what are believed to be the most common questions a new user may have. References to the "Dashboard", "Settings" and "Home" pages may be color coded (e.g., orange, blue and red respectively) to make it easy to follow. A direct e-mail link is provided for feedback at the bottom of this page. Navigation buttons at the top of this page make it possible to return to either the Home page or the Dashboard page. For the "FAQ" button, the on click event handled by the Macro "FAQsTab" which switches the currently viewable worksheet to a "FAQs" worksheet.

Figure 2:
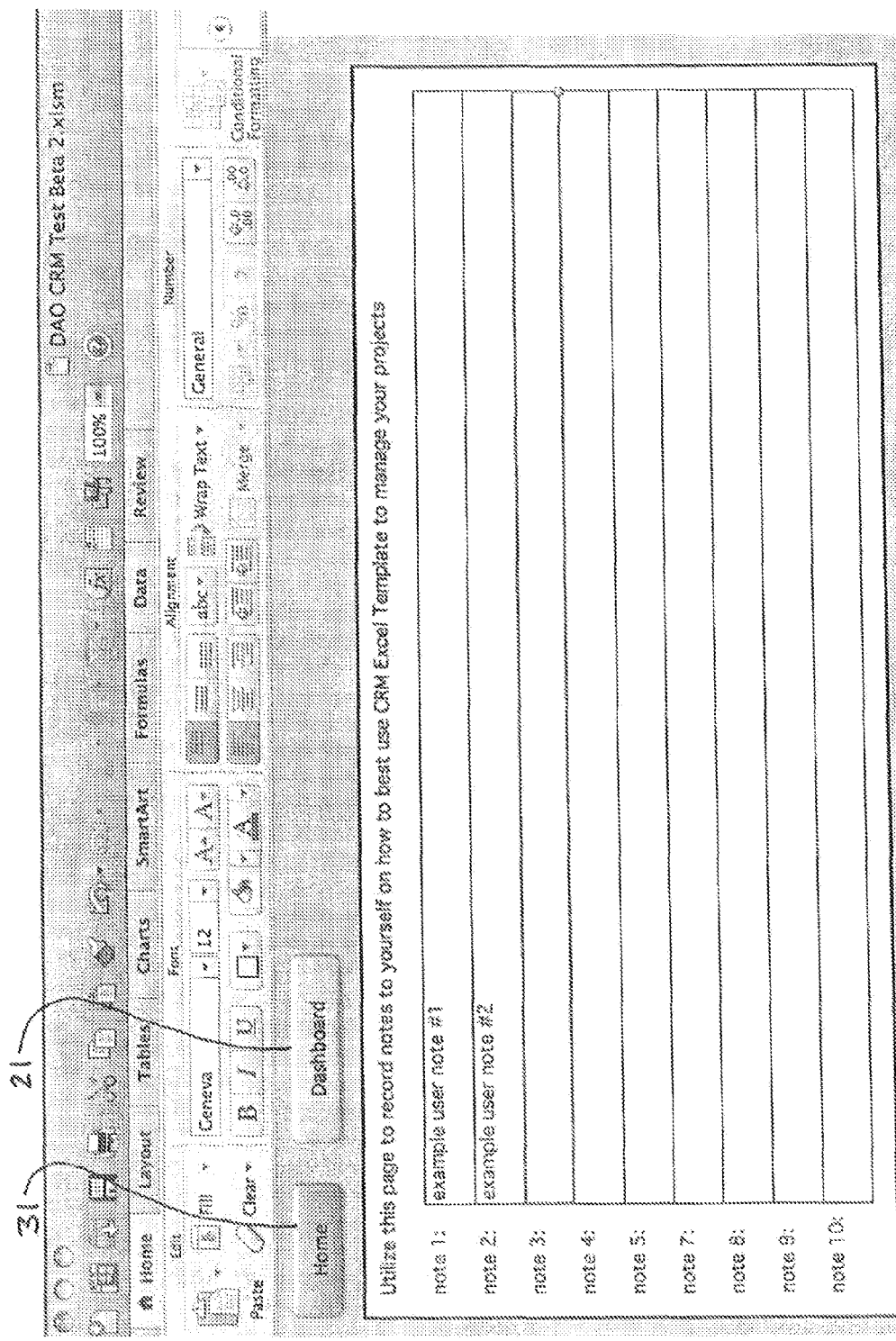
FIG. 2 is a screenshot of a notes screen of a data processing system according to the principles of the present invention.

Clicking on the "My Notes" button 12 takes the user to a page, depicted in FIG. 2, where they can enter in, for future reference, their own ideas about how to best utilize the tool to manage their clients and/or projects. Navigation buttons at the top of this page make it possible to return to either the Home page 10 or the Dashboard page 30. For the "My Notes" button 14, the on click event may be handled by the Macro "MyNotesTab", which switches the currently viewable worksheet to the "MyNotes" worksheet.

Clicking on the "Developer Credits" button 16 takes the user to a page where they can view descriptions of the developers of the product they are using. Navigation buttons at the top of this page make it possible to return to either the Home page 10 or the Dashboard page 30. For this button, the on click event may be handled by the Macro "DeveloperCreditsTab", which switches the currently viewable worksheet to the "DeveloperCredits" worksheet.

Clicking on the "Contact Us" button 17 takes the user to a page where they can source an e-mail address (hyperlinked to the user's e-mail browser) and a postal mailing address to provide feedback to the developers/company. Navigation buttons at the top of this page make it possible to return to either the Home page 10 or the Dashboard page 30. For this button, the on click event may be handled by the Macro "DeveloperCreditsTab", which switches the currently viewable worksheet to the "DeveloperCredits" worksheet.

Clicking on the "User Agreement" button 18 takes the user to a page where they can view a copy of the End User License Agreement ("EULA"), which they may have agreed to when they purchased the product on-line from a web site. Navigation buttons at the top of this page make it possible to return to either the Home page 10 or the Dashboard page 30. For this button, the on click event may be handled by the Macro "UserAgreementTab", which switches the currently viewable worksheet to the "UserAgreement" worksheet.

Referring now to FIG. 2, a notes page of the data processing system 1 of the present invention is shown that allows users to enter comments or notes for future reference regarding their ideas about utilizing the tool to manage their clients and/or projects. A home button 31 at the top of the page makes it possible to return to the home page 10, and a dashboard button 21 directs users to the Dashboard page 30.

Figure 3:
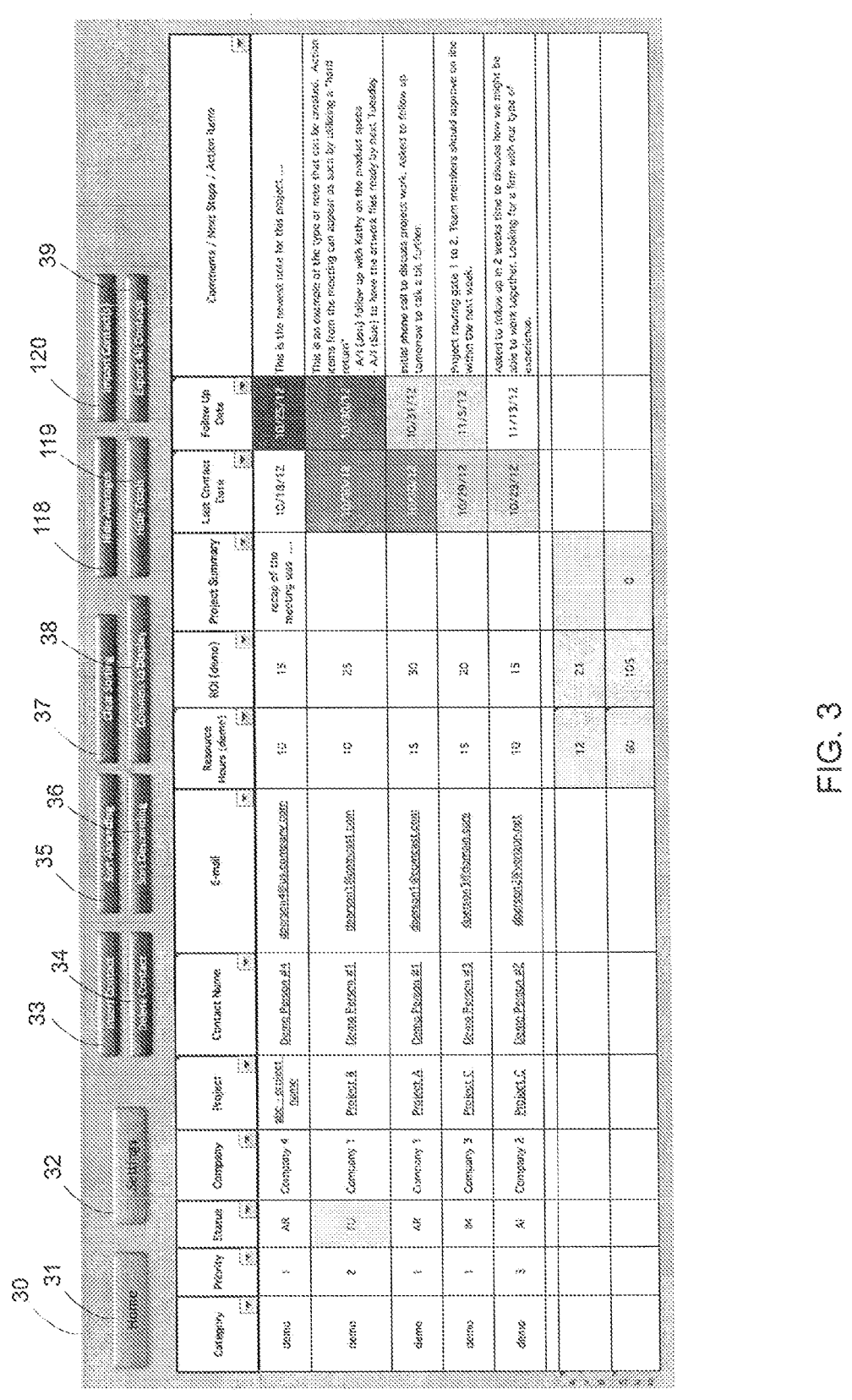

Referring now to FIG. 3, a view of the dashboard screen 30 (or worksheet) of the data processing system 1 of the present invention is shown. The dashboard screen 30 makes it easy for users to navigate the system 1, thus increasing productivity. Several buttons may be provided on the dashboard screen 30, such as a home button 31, a settings button 32, an insert contact button 33, a delete contact button 34, a sort ascending button 35, a sort descending button 36, a clear sorting button 37, a columns to display button 38, an export all contacts button 39, an import contacts button 120, a hide averages button 118 (or a show averages button), and a hide totals 119 button (or a show totals button). Clicking on the home button 31 takes the user back to home page 10 where they may select various buttons, as described herein. Clicking on the "Settings" button 32 takes the user to the settings page 80 where they may customize the Home Page Title, User Column Names, Category Names, New Contact Height, New Note Height, Background color and font styles for a total of 5 date fields, Status Codes and Priority Codes.

Figure 4:
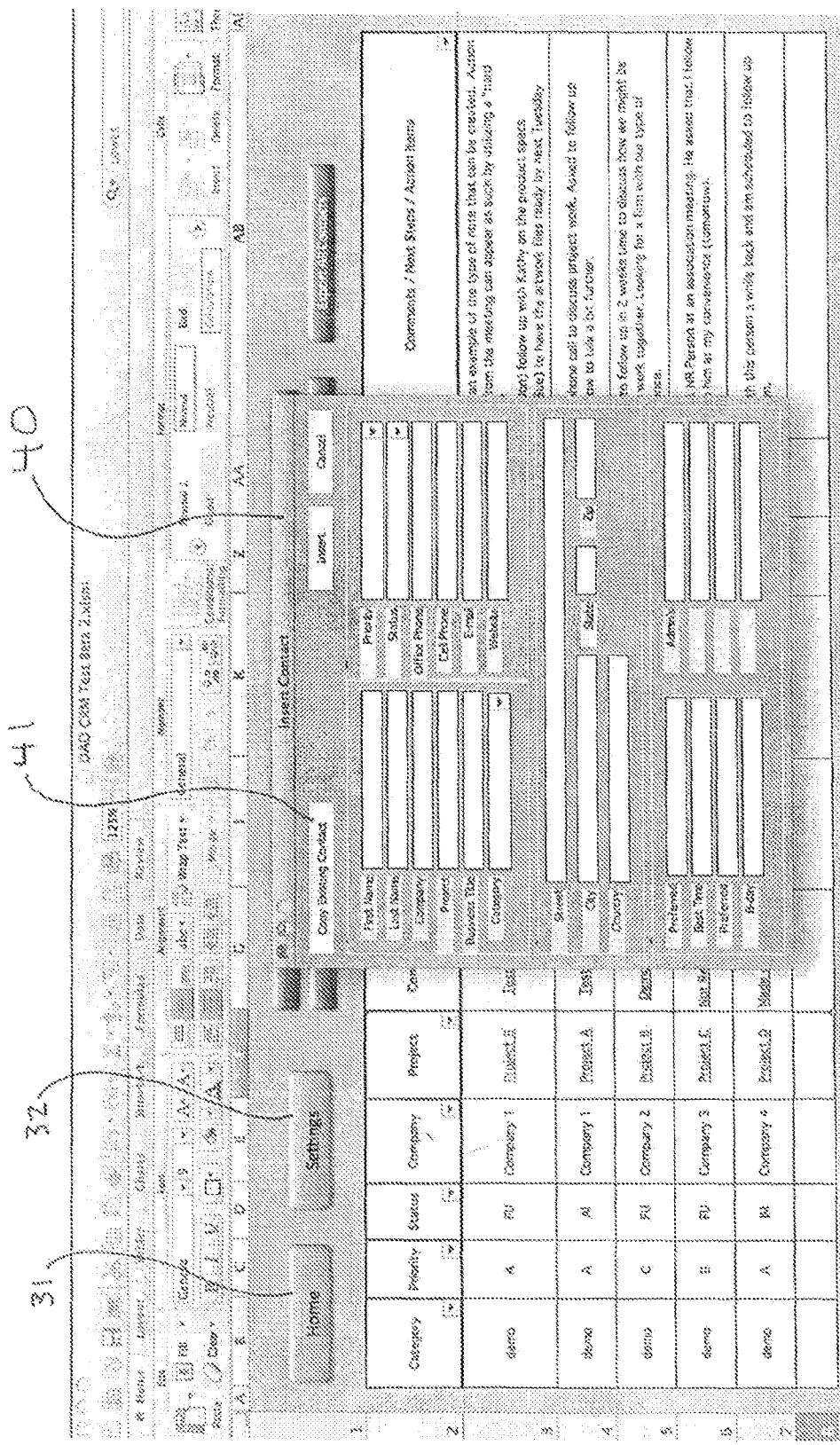
FIG. 4 is a screenshot of the dashboard screen with an insert contact dialog box of a data processing system according to the principles of the present invention.

With reference to FIG. 3 and FIG. 4, clicking on the "Insert Contact" button 33 takes the user to a blank contact information screen 40 (Insert Contact screen or dialog box) where they can input: First Name, Last Name, Company, Project, Business Title, Category, Priority, Status, Office Phone number, Cell Phone number, E-mail address, Website address, Street address, City, State, Zip Code and Country. In the bottom of the insert contact sheet the user is able to enter data for the 8 customized user defined fields, established on the Settings page 80. Once the user is done entering their data, they click the "insert" button, which then creates a contact page and takes the user back to the dashboard page 30 where the information they entered is displayed. The "insert" button on the dialog box may trigger a macro/function (i.e., "cmdInsert_Click( )") to be executed. This function first creates a unique hash value that is based on the user input values and the current time in milliseconds that is used as the worksheet name, and essentially the "key" value to look-up this exact contact at later points in time. This means that, no matter what the user does, they cannot cause the program to generate two identical look-up "keys" that would essentially break the contact storage mechanism (e.g., one unique worksheet per contact). The method then makes a copy of a template contact worksheet and renames the worksheet to the "key" value previously generated. Then, the function fills in the information provided by the user into the newly created worksheet. After the worksheet has been copied and the data filled in, the function then goes back to the "master" worksheet to insert a new row with pointers back to the data values on the contact worksheet page.

With continued reference to FIG. 4, the Insert Contact screen (dialog box) 40 of the data processing system 1 of the present invention is shown. Clicking on the "Copy Existing Contact" button 41 gives the user the ability of selecting an existing contact and their information, to be duplicated, as a new contact. This feature is designed to support a contact that may have more than one project association, eliminating the need to enter the basic contact information more than once. This method simply prompts the user which contact it wants to copy the information from, and then, once the user responds, it fills in the pop-up fields with the data from the corresponding contact that the user had selected. Clicking on the "Cancel" button (on the insert contact sheet), takes the user back to the dashboard page without creating a new contact. This method unloads the currently visible pop-up form.

In one preferred and non-limiting embodiment, new contact records may be inserted via image-based processing of business cards. Business card optical readers, such as but not limited to standalone scanners or cameras built-in to various mobile devices, may capture a name, title, phone number(s), company name, mailing address, e-mail address, website, and/or the like. It will be appreciated that various optical character recognition (OCR) solutions may be used to carry out this feature, and that software on a mobile device or other computer may interface with the system to import the information as a contact or other form of record.

Figure 6:
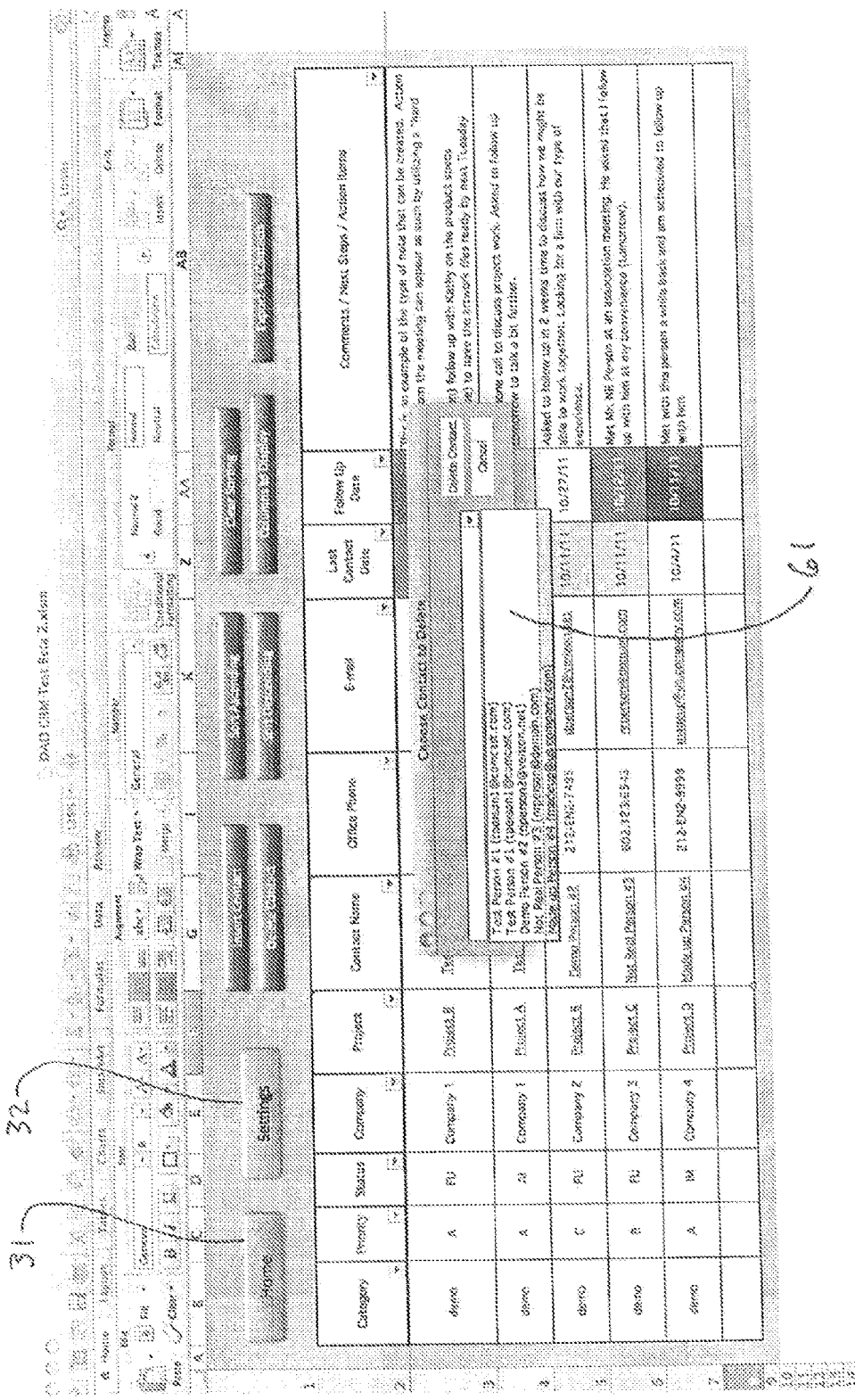
FIG. 6 is a screenshot of the dashboard screen with a delete contact dialog box of a data processing system according to the principles of the present invention.

Referring to FIG. 3 and FIG. 6, clicking on the "Delete Contact" button 34 allows the user to delete any existing contact from the tool by displaying a Choose Contact to Delete screen (dialog box). Selecting a name from the drop down menu 61 brings up a "Warning" which asks the user to confirm that they in fact wish to delete the contact select. The warning notifies the user that the operation cannot be undone and asks them to confirm (yes or no) if they wish to proceed. Selecting "Yes" deletes the contact from the Tool, selecting "No" returns the user back to the Dashboard page 30. On click event is handled may be handled by a macro/function (i.e., "DeleteContactPopUp") that displays the form "frmDeleteContact" which allows the user to choose which contact to delete. The delete contact form presents a list of contacts in the order they are currently displayed in the dashboard, then, based on the index of the user selection, the unique "key" for that contact is looked up in a hidden column of that contacts row, and that key is then used to delete the corresponding worksheet for the contact and then the row on the dashboard view, such that a pointer (e.g., reference) to the worksheet data is removed.

By first clicking within a column and then selecting the "Sort Ascending" button 35, the contacts displayed on the current dashboard view are sorted from highest to lowest. The on click event may be handled by the "sortAscending" macro. This button is provided so that the spreadsheet can be locked for purposes of stability and security, while still allowing the worksheet "Master" to be easily sortable based on any of the columns. When this button is clicked, the macro is able to determine the column of the currently selected cell through the Selection.Address property. This column is then used as the sorting key and this sort is added to the list of currently active sorts. Using the currently selection as the indicator to which column to sort by allows us to simplify the user interaction when the user is specifying the sort. Adding this sort to the list of sorts allows the user to have a hierarchical sorting setup. For instance, first sort column A ascending, then sort column B descending, etc. Getting this hierarchical sorting to function correctly in Excel 2003 presents a unique challenge, since the sorting API does not provide a way to simply add a parameter to the existing sort. Therefore, there is provided a place on the "LookupTables" worksheet to remember all the sorting parameters the user has specified so that these parameters can be included over time, and then mimic the sorting functionality that is available in Excel 2007 and newer versions, and/or other spreadsheet-based applications and programs. This feature obviates the need for users to highlight different data fields and choose "sort". Moreover, the format of the particular data structure used may maintain data integrity while sorting, allowing quick multiple sorting as needed by the end user.

By first clicking within a column and then selecting the "Sort Descending" button 36 the contacts displayed on the current dashboard view are sorted from lowest to highest. The on click event may be handled by the "sortDescending" macro. This functionality is similar to the technical description of the "Sort Ascending" button.

Selecting the "Clear Sort" button 37, clears any previous sorts to the dashboard page data and allows the user to resort using either the "Sort Ascending" or "Sort Descending" buttons described above. Since the invention allows users to iteratively construct complex sorting parameters, there is a need for a way for them to be able to clear the current sort and start again. Therefore, this button does exactly that: it clears the existing sort parameters that exist on the sheet, however it does not restore them to their original order of entry, instead it leaves them sorted as they were before the sort was cleared.

Figure 7:
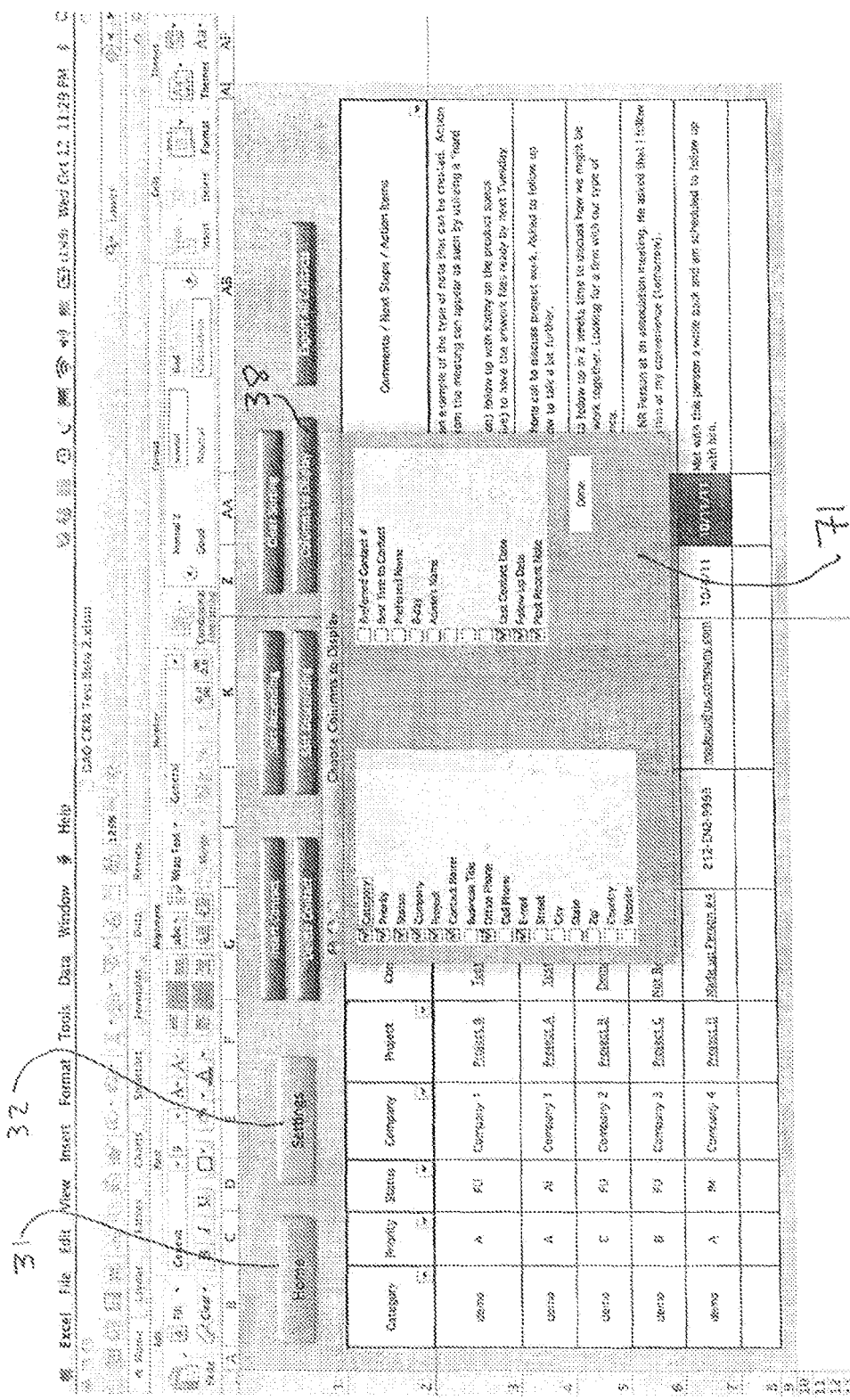
FIG. 7 is a screenshot of the dashboard screen with a columns to display dialog box of a data processing system according to the principles of the present invention.

Referring to FIG. 3 and FIG. 7, a feature of the data processing system 1 of the present invention is presented by the "Columns to Display" button 38. Clicking on this button brings up a Choose Columns to Display screen or dialog box 71, and allows the user to select which of the contact data fields (e.g., 27 contact fields) to display on the dashboard page. Attempting to "hide" the contact name brings up a warning informing the user that, if they hide the column, they will not be able to navigate back to the individual contact pages. This button displays a pop-up window 71 that displays a list of all the available data fields with a check box next to each field. When the user clicks on the check box a macro or function is run to either hide or display the corresponding column on the "Master" tab, i.e., the Dashboard page 30. When the box is checked, the column is visible, and when it is not checked, the column is not visible.

Referring now to FIG. 3, clicking the "Export All Contacts" button 39 allows the user to export all the contacts and the most recent set of dates and comments to a Comma Separated Values (CSV) file (or other data file) for use in other applications. All 27 fields, which can be displayed on the dashboard page, are exported to the CSV file with each contact's information displayed in a separate row. This macro first prompts the user to notify them about the export, which is about to happen. This prompt also confirms the users intent to perform the export through providing a "Yes" and "No" button for response to the displayed question. Once the intent is confirmed, the user is asked to specify a file name and location for the exported file. Once the file name has been specified, the macro then iterates over the values in the "Master" tab, i.e., Dashboard page 30, and puts them in a text file with the standard CSV format. The macro exports fields independent of whether or not they are currently visible on the "Master" tab.

In one embodiment, multiple methods for exporting data may be provided. For example, one method may involve exporting all contacts, plus only the last note for each contact into a single CSV file. In another example, all contacts may be exported into a single CSV file, including all contact note history. Either method may also be available on the individual contact pages. These features allow users to share individual project information. In one embodiment, an enhanced "export all" feature may be provided for contacts to include the customized "resource" fields (e.g., 5 columns×13 rows) unique to each contact/project sheet. The enhanced "export all" feature may be located, for example, to the right of the contact information at the top of the interface.

In one embodiment, an archive selection button may be provided as yet another export option. The archive selection button may execute a quick and efficient routine to designate a set or group of contact information to be saved for future reference and subsequently removed from the template. This archival export option allows users to decide which contacts/projects are to be saved as an archive and then removed.

In embodiments, contacts, projects, and other data may be imported into the system. In some instances, imported data may cause existing data to be deleted and/or replaced. Further, users may be provided with the option to keep the old record or replace the old record. The replacement option may involve a comparison between name and project fields to find common entries.

In some embodiments, an import contact(s) button 120 allows users the ability to import data, formatted as a comma separate value file (CSV), following the headers as defined by the Settings page. Further, a show averages/hide averages button 118 allows the user to see or hide the averages of the numbers, if present, at the bottom of the customized User Defined Columns as named in FIG. 8, item 85. The displayed name of the button gives the user the option to do the opposite of what currently appears on the Dashboard page. When the averages are displayed, the button 118 reads "Hide Averages" and when the averages are not displayed, the button 118 reads "Show Averages".

Figure 8:
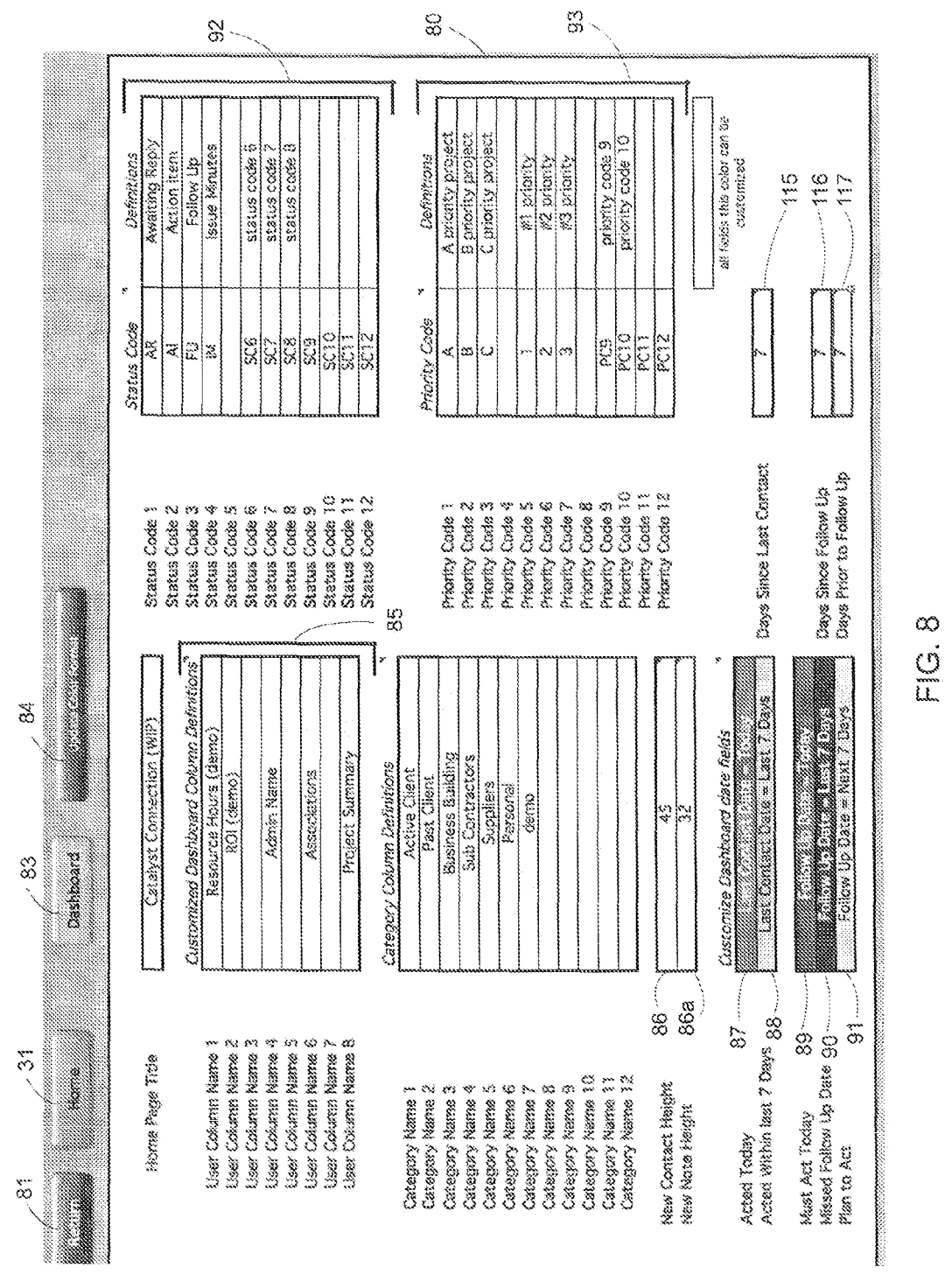

In some embodiments, a show totals or hide totals button 119 allows the user to see or hide the totals of the numbers, if present, at the bottom of the customized User Defined Columns as named in FIG. 8, item 85. The displayed name of the button gives the user the option to do the opposite of what currently appears on the Dashboard page. When the totals are displayed, the button 119 reads "Hide Totals" and when the averages are not displayed, the button 119 reads "Show Totals".

Clicking on the individual project name (which appears as hyperlink on the dashboard page) takes the user to the unique worksheet containing that project's contact information and historical notes. The column containing the project names can be sorted in either ascending or descending order if desired. A hyperlink to the specific contacts unique tab is inserted when the project name is referenced on the "Master" tab. This hyperlink allows the user to quickly view the contact in question.

Clicking on the individual contact name (which appears as hyperlink on the dashboard page) takes the user to the unique worksheet containing that project's contact information and historical notes. The column containing the contact names can be sorted in either ascending or descending order if desired. The same hyperlink mechanism is used here as was used for the Project Name link.

Clicking on a contact's e-mail name opens up the users e-mail browser allowing the user to send an e-mail to the contact. The contact's e-mail address is pre-populated. The column containing e-mail names can be sorted in either ascending or descending order if desired. A standard "mailto:" protocol reference is attached to the beginning of the user specified email address. This allows for the user to compose the email in whichever email editor he has setup, through his operating system, to handle such events.

The last contact date column (set of fields) displays the last day (date) as entered on the client's/project contact page. This allows the user to understand the last time this client was contacted, the project worked on, or a status note was entered. The column containing the last contact date can be sorted in either ascending or descending order if desired. The color of the Last Contact Date column may be dictated by a conditional formatting rule that is based off user input on the settings page.

The follow up date column (set of fields) displays the follow-up day (date) as entered on the client's/project contact page. Designed to allow the user to understand the next time this client is to be contacted, this feature signals a due date or a reminder date. The column containing the follow up date can be sorted in either ascending or descending order if desired. The color of the Follow Up Date column is dictated by a conditional formatting rule that is based off user input on the settings page 80.

All columns displayed on the dashboard page, selected by using the "Columns to Display" feature 38, can be sorted in either ascending or descending order if desired. This effectively allows users to control the content of what is displayed on the dashboard page. Thus, it is possible to create multiple views for different audiences (e.g., sets of users). Further, there may be provided an option for users to define and determine the order of all columns (and in some embodiments, all columns except for the project or contact name columns) from the Settings page.

Each of the address fields for a contact (street address, city, state, zip and country) may be linked to a map feature, such as that provided by Google Maps, which displays the location. To provide the mapping feature, a hyperlink is constructed based on the user input. This hyperlink follows the API specified by Google Maps (or other service), so that the user is presented the location with a map. It will be appreciated that numerous mapping services and/or websites may be utilized.

Referring now to FIG. 8, a Settings screen (page) 80 of the data processing system 1 of the present invention is shown. On the settings screen, there may be displayed a "Return" button 81, a "Home" button 31 a "Dashboard" button 83, and an "Update Color Format" button 84. Clicking on the "Return" button 81 (on click event) may initiate a function call (macro), looks up the tab name that called this tab last (the macro that brought the user to the settings page updated this value) and then it redirects the user to the page indicated by that value. This provides for quick access to and from the Settings page and the contact page, which a user might be editing. Clicking on the "Update Color Format" button updates (changes) the colors of the date fields displayed on the dashboard page. The on click event for this button is handled by a function call (macro) which updates the conditional formatting rules applied to the Last Contact and Follow Up Date fields on the "Master" worksheet. These conditional formatting rules simply state that if the date in the particular column falls within the date ranges specified (i.e., last 7 days, today, next 7 days, etc.) then it will be colored and formatted according to the colors and formats applied to the corresponding cells in the "Settings" worksheet.

Also on the Settings screen 80 is provided a Home Page Title input field to customize the title of the Home page. Verbiage inputted here appears as the title of the Home page. Editing this cell may not provide any extra functionality. The value is simple referenced by the "GUI" worksheet to display a custom Title for the User. Customized Dashboard Column Definitions are a total of 8 input fields (User Column Name 1-8) 85 which allow the user to create unique client/project related fields. Users may thus customize various aspects such as timing, business building criteria, stage gate management, purchase order tracking, additional project information, and additional contact information. These labels then appear as part of every contact sheet. The labels also become part of the Columns to Display choices as part of the Columns to Display feature on the Dashboard page. The values entered into these cells are simply referenced by other parts of the spreadsheet which desire to display the title for these 8 columns or data fields. Technically all the column or data field titles are done in this fashion, however only these 8 are exposed to the user for configuration.

Also provided on the Settings screen 80 are Category Column Definitions, which are a number (e.g., 12) of Category Names to allow the user to define the "Category" fields, which appear on the contact sheets. Just like the Customized Column names, these values are referenced by other parts of the application wanting to display categories to the user. The New Contact Height field 86 allows the user to define the row height for each new contact displayed on the Dashboard page. The value of this field is referenced each time a contact row is inserted into the "Master" worksheet, and the height of that row is set accordingly. The New Note Height field 86a allows the user to define the row height for each new note created as part of any contact/project sheet. This field provides the same functionality as the New Contact Height field, but is applied when notes are inserted on each contact's unique worksheet. For the Acted Today field 87, users can select the font and color which appears on the Dashboard page when the last contact date equals today's date. Similarly, for the Acted Within last 7 days field 88, the font and color selected appears on the Dashboard page when the last contact date equals one of the last 7 days. The update "Color Format" button 84 at the top of the Setting page must be clicked for any changes made to take effect. The text formatting applied to these fields (cells) are referenced when the "Update Color Format" button is pressed, and the formatting is copied over to the conditional formatting rules applied on the date columns of the "Master" worksheet. In one embodiment, users may specify the number of days to schedule a "follow up", and/or the time since last contact. Color coding and/or sorting features, as described herein, may be used to create timely "to do" lists.

The "Must Act Today" field 89 (Follow Up Date=Today) indicates the font and color which appears on the Dashboard page when the follow up date equals today's date. The "Update Color Format" button 84 at the top of the Setting page must be clicked for any changes made to take effect. Similarly, the "Missed Follow Up Date" 90 and "Plan to Act" field 91 (cells) indicates the font and color to appear on the Dashboard page when the follow up date equals one of the last 7 (or an otherwise specified number) days or one of the next 7 (or an otherwise specified number) days, respectively; the number of days being defined by the user at the bottom of the Settings page 80. The text formatting applied to these cells is referenced when the "Update Color Format" button is pressed, and the formatting is copied over to the conditional formatting rules applied on the date columns of the "Master" worksheet. At the bottom of the Settings page 80, there may be provided a "Days Since Last Contact" field 115, a "Days Since Follow Up" field 116, and a "Days Prior to Follow Up" field 117. These fields may be used to customize and specify when indicators and/or reminders are provided to users through color coding or otherwise.

With continued reference to FIG. 8, several fields representing status codes and corresponding definitions are provided 92. A predetermined number of status code fields (i.e., 12) allow the user to define the various status codes, which appear on the contact sheets, which are also reflected back on the Dashboard page. Also provided are several fields representing a predetermined number of priority code fields (i.e., 12), along with corresponding fields for defining the various priority codes 93, which appear on the contact sheets, which are also reflected back on the Dashboard page. Just like the Customized Column names, these values are referenced by other parts of the application wanting to display status codes and/or priority codes to the user.

Figure 9:
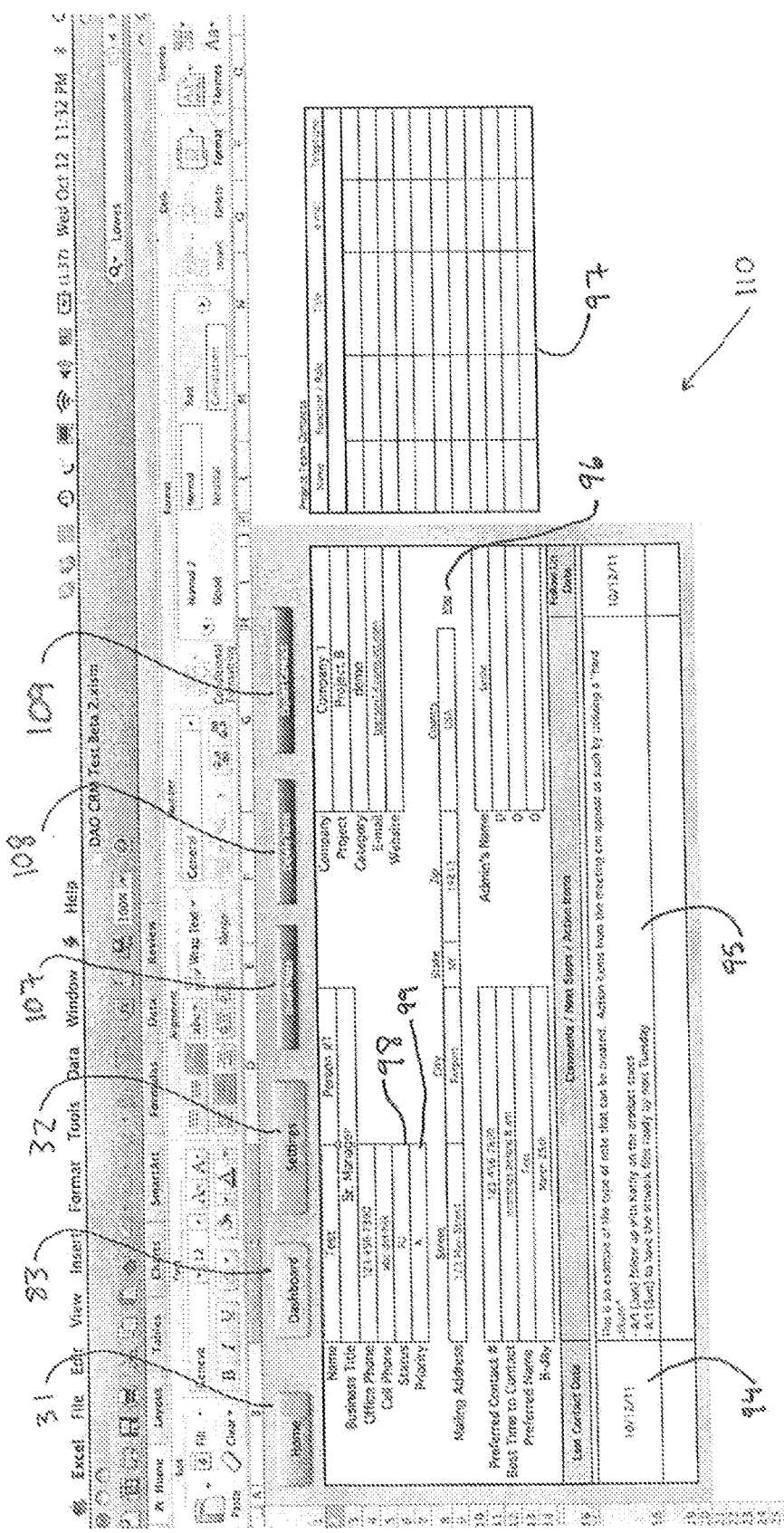
FIG. 9 is a screenshot of a contacts screen of data processing system according to the principles of the present invention.

Referring now to FIG. 9, a screenshot of a user interface for a Contacts page 110 of the data processing system 1 of the present invention is provided. On the Contacts page 110, there is provided a "Home" button 31, "Settings" button 32, "Dashboard" button 83, "Insert Note" button 91, "Delete Note" button 92, and "Export Contact" button 93. Clicking on the "Insert Note" button 91 brings up an "Insert New Note" input screen 101 (e.g. a dialog box or pop-up) (shown in FIG. 10), allowing the user to create a new note. The on click event for the "Insert Note" button 91 is handled by the "InsertNewNote" macro. This macro/function displays a form (i.e., "frmContactNoteInsertMac").

Figure 10:
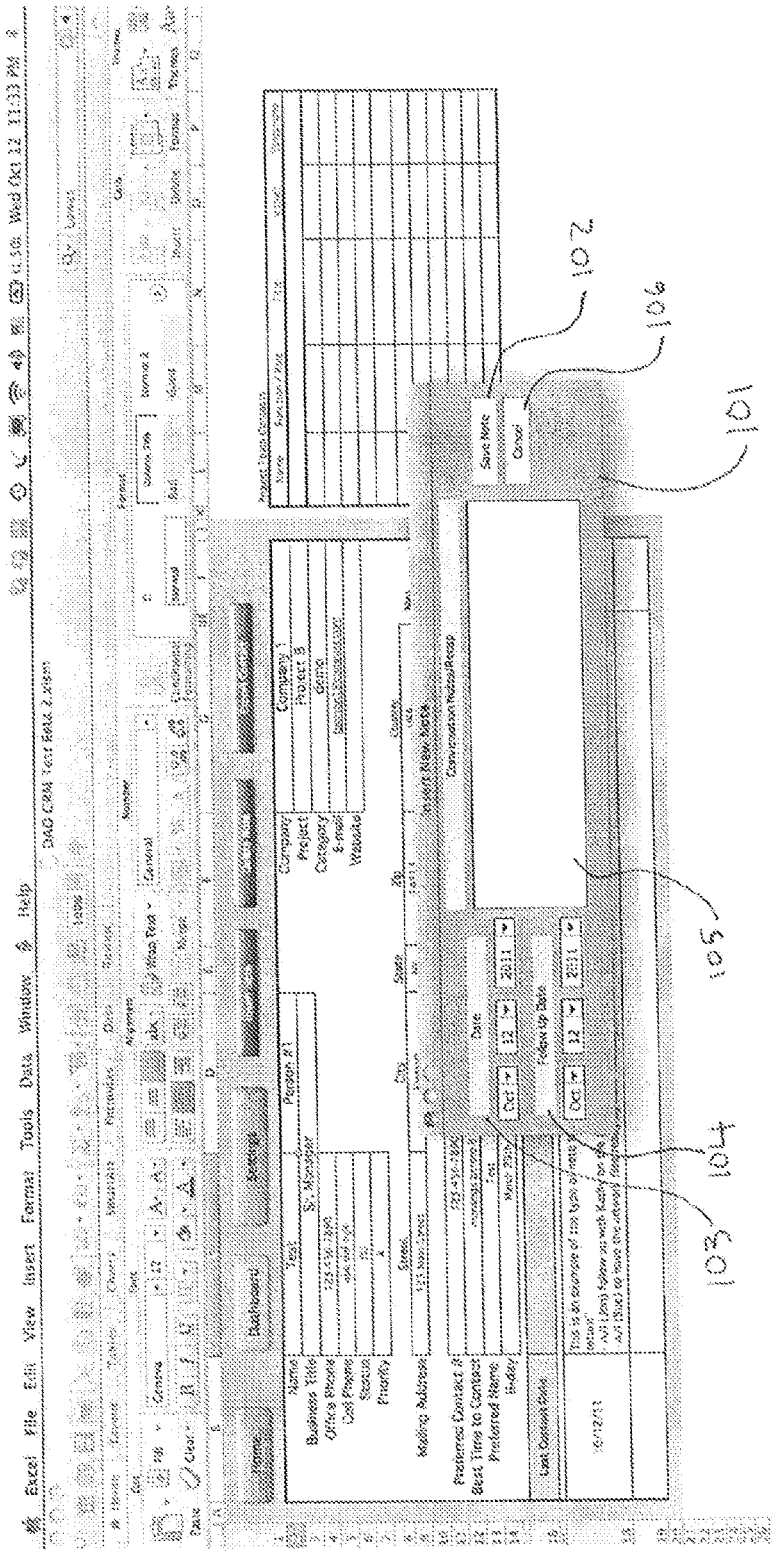
FIG. 10 is a screenshot of the contacts screen with an insert new note dialog box of a data processing system according to the principles of the present invention.

Referring now to FIG. 10, on the Insert New Note input screen 101, the user is able to select the date of the note and the date for the next follow-up along with verbiage of the note itself. Once the note is saved, by clicking on the "Save Note" button 102, the newly created note appears on the client contact page. In one embodiment, the newly created note may be automatically displayed back on the Dashboard page and a user may not have an option to view it. The displayed pop-up has 5 major parts: Date 103, Follow Up Date 104, notes field 105, a "Save Note" button 102, and a cancel button 106. The Date 103 and Follow Up Date 104 are initialized with the current date, so the user can easily pick a date in the near future for the Follow Up Date 104. The Date field 103 may be the date of entry, although it is possible to change in the case something is being recorded on a day other than it occurred. The notes field 105 allows the user to enter in all the notes corresponding to this last interaction. The "Save Note" button 102 takes the input from the form and inserts it into the contact page at the top of all the previous notes. This allows for the most recent note to always be easily visible and making older notes naturally get pushed down the list. The cancel button 106 dismisses the pop-up without modifying the notes at all.

In one preferred and non-limiting embodiment, e-mail and/or calendar reminders may be provided for key action items in advance of due dates. These reminders may be provided to a distribution list (e.g., a list of e-mail addresses for various individuals) and would repeat the last set of comments, next steps, and/or action items. A user may toggle these reminders on or off in order to specify what notes will cause e-mail reminders to be generated.

Figure 11:
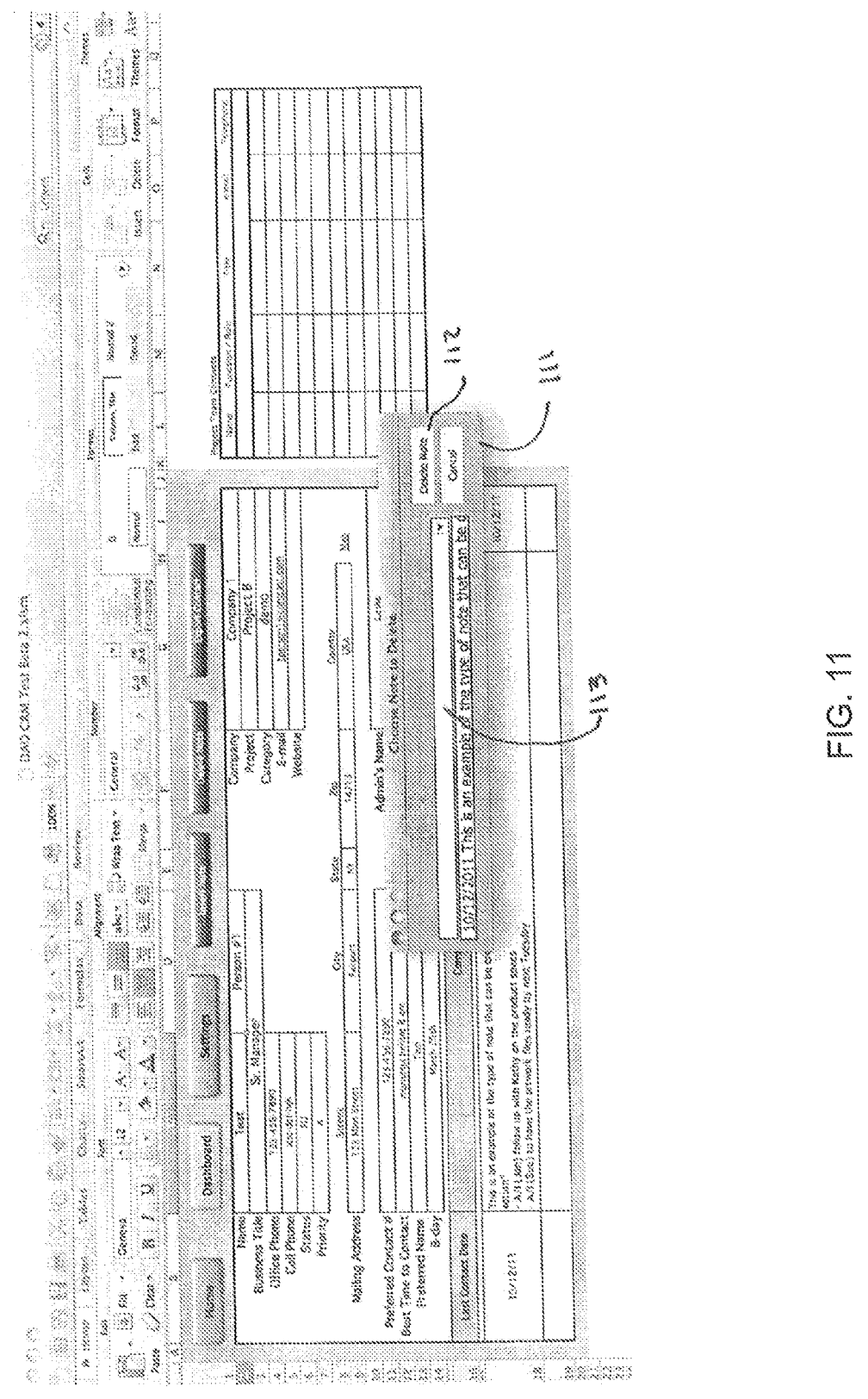

Referring to FIG. 9 and FIG. 11, clicking on the "Delete Note" button 92 displays a Choose Note to Delete screen 111, such as a dialog box or pop-up, allowing the user to delete any of the notes within the current contact page. The date and the first couple words of each note appear as part of a drop down menu 113 to be selected. Once the note to be deleted is selected, the user selects the "Delete Note" button 92 and the note is erased. Selecting the cancel button cancels out the selection. The on click event is handled by a "DeleteNote" function/macro. This function/macro displays a form (e.g., "frmDeleteNote") 111 as a pop-up. This pop-up 111 may be identical in layout to the "frmDeleteContact" pop-up, however it is used to delete notes, rather than contacts. The form 111 displays a list to the user, which has been initialized with all Last Contact Date 94, and Notes data 95 from the various notes for the currently visible contact. A user can then select one of these notes and click the "Delete" button, which will send the index of the selected note to a macro, which then uses this index to delete the note at that index.

With continued reference to FIG. 9, the "Export Contact" button 93 allows the user to export, in a Comma Separated Values (CSV) format or other type of data file format, all the contacts information, including all of the notes. The export contact button's 93 on click event event is handled by the "ExportContact" function/macro, which first verifies a user's intent to export this contact in the same way the user's intent to export all contacts was verified. Once this intent is confirmed, the macro will export ALL of the contacts information to a Comma Separated Values (CSV) file. This function differs from the Export All Contacts feature 39 in that it exports all of the notes fields, whereas the Export All Contacts feature 39 only exports the most recent note. The Contacts page 90 also may provide an e-mail link and a website link. The e-mail link brings a user to the user's e-mail browser allowing the user to send an e-mail to the contact. This link may use a standard "mailto:" protocol reference, so that the Operating System's default mail handler can compose a message to the supplied email address when it is clicked. Clicking on a website link brings a user to the webpage in the user's default web browser application. The user supplied website is used as the destination of this hyperlink. The code tells excel that the contents are to be hyperlinked and creates a hyperlink with the user-entered web address. Next to a contact's mailing address may be a link to a map of the mailing address 96, which brings up a map from Google Maps or from some other website or service. To provide the mapping feature, a hyperlink is constructed based on the user input. This hyperlink follows the API specified by Google Maps so that the user is presented the location in Google Maps. It will be appreciated that other mapping services may be utilized. It will be appreciated that various other ways of sharing exported data may be provided.

Also on the Contacts page 90 may be provided a, Project Resource table 97 which may be made up of a predetermined number of columns (e.g., 5) which may represent, for example, name, function/role, title, e-mail, or telephone number, for keeping track of project team members. Typing in a valid e-mail address in the e-mail column creates an e-mail hyperlink to the user's e-mail browser allowing the user to send an e-mail to the contact. This space is left for the user to input data that will not be referenced by other parts of the tool. This allows the user to specify other relevant people to the project without the need to create an entry for each contact.

After any note has been created, the user may edit it within the yellow fields of the Comments/Next Steps/Action Items, and may copy and paste the note contents into other applications. Hard returns may be used to create action item lists or just to separate different thoughts. The verbiage may be formatted (color, point size, font, bold, italicized, underlined . . . ) to fit the user's needs. The insert notes function/macro simply inserts the resulting text into these fields, which allows the user to manually edit them afterwards if they so desire. The user may update the status of the client/project by selecting a predefined choice (defined on the Settings page 80) by first clicking in the Status box (cell) 98, which brings up a dual arrow button to the right. Clicking on either on the double arrow or inside the status box brings up status choices for selection. The entry to the Status cell is controlled by a data validation tool, which allows the user to select one of the Status Codes 92 they have defined on the Settings page, the drop down list refers to the data on the settings page. The user can also enter a status code that was not defined on the settings page by simply typing it in, however this status code will not be added to the list on the Settings page.

The user may update the priority of the client/project by selecting a predefined choice (defined back on the Setting page 80) by first clicking in the Priority box (cell) 99, which brings up a dual arrow button to the right. Clicking on either on the double arrow or inside the status box brings up priority choices for selection. The functionality of this cell may be identical to that of the Status cell 98, with the exception that it instead references the Priority Codes 93 that are defined on the Settings page 80.

The user may update the category of the client/project by selecting a predefined choice (defined back on the Setting page) by first clicking in the Category box, which brings up a dual arrow button to the right. Clicking on either on the double arrow or inside the status box brings up category choices for selection. The functionality of this cell is identical to that of the Status Cell, with the exception that it instead references the Categories that are defined on the settings page.

In cells C/D 11 through 14 and G/H/I 11 through 14, are the input areas for the 8 custom defined user fields created on the Settings page. The user may input an update of these fields by clicking within and typing in an entry. The names of the customer defined data fields are references to the data entered on the settings page. This allows the user to change the name in a single location and have it reflected on all the contact pages.

In one preferred and non-limiting embodiment of the present invention, a Lookup table/worksheet is provided. This may be hidden from users. The "LookupTables" worksheet is a place that keeps track of data that needs to be persisted across different launches of the application and that are used for various backend calculations in the macros. In one embodiment, this worksheet is the central reference for the data field names that are not user-editable. It also keeps track of whether or not the spreadsheet's password for opening has been removed so that a prompt can be provided to inquire whether or not the user wants to remove it accordingly. This worksheet also generates the values of TODAY( ), TODAY( )−7, and TODAY( )+7 so that then can be easily referenced by the Conditional formatting rules that only allow references to cells and not the calculation of values. In one embodiment, the values of TODAY( ), TODAY( )−7, and TODAY( )+7 may be specified by a user on the Settings page. In Microsoft Excel 2003, for example, this worksheet keeps track of the currently defined sort parameters that the user has applied to the "Master" worksheet, so that the data processing system 1 can mimic the sorting functionality available in Excel 2007 and newer versions, and/or other spreadsheet-based applications and programs. This worksheet also keeps track of the total number of contacts entered into the workbook; this is referenced in miscellaneous macro calculations. Further, this worksheet also keeps a list of the months and years that will be available for choosing in the insert note feature. In one embodiment, the Lookup table/worksheet provides the ability to create a "demo only" version of any customized template. A "demo only" version limits the total number of contacts allowed and requests a purchase of the system/software package after the total limit has been reached. This feature allows for a single file to be used as both a full release or a demonstration copy by resetting values in the password protected LookupTables.

In one preferred and non-limiting embodiment of the present invention, blank templates may be provided that are hidden from users. The "Blank Template" worksheet is copied every time a new contact is created and then the user specific data is entered into the new copy. This allows for the template to be designed and modified in a single location and then be replicated as needed.

For implementations of this invention in Excel or other like applications, VBA macros/functions may be provided to perform various functionalities. The "insert" button on the popup triggers the "cmdInsert_Click( )" method to be executed. This method first creates a unique hash value that is based on the user input values and the current time in milliseconds that is used as the worksheet name, and essentially the "key" value to lookup this exact contact at later points in time. This means that no matter what the user does, they cannot cause us to generate two identical lookup "keys" that would essentially break the contact storage mechanism (one unique worksheet per contact). The method then makes a copy of a template contact worksheet and renames the worksheet to the "key" value previously generated. Then the method fills in the information provided by the user into the newly created worksheet. After the worksheet has been copied and the data filled in, the method then goes back to the "master" worksheet to insert a new row with pointers back to the data values on the contact worksheet page.

When using Excel on a Microsoft Operating System there is a nice date picker feature than can be used to select dates. This naturally would be a good choice for use in the insert note feature. However this functionality is not available on the Macintosh platform. For this reason a "date picker" feature is provided that is compatible with both systems, thus enabling platform portability. Conditional logic may be provided to decide which platform was being used and present the different methods accordingly, however this complicates code maintenance as any modifications to the date choosing feature would need to modify two sections of code rather than one.

In one preferred and non-limiting embodiment, reporting tools may be provided. The reporting tools are configured to allow users to select which fields, and for which records, to generate a report. A user may also be given a choice of report format including, for example, CSV, Word (e.g., .doc or .docx), plain text, PDF, and the like.

In a further preferred and non-limiting embodiment, the system may include additional template security. The template security feature may generate a unique 14 digit alpha numeric passcode and transmit it back to the provider of the system as proof of a single copy of the license being purchased. Then, as an example, one to two times per year the user will be required to re-validate the template by entering the 14 digit alpha numeric passcode, thus discouraging users from passing on "borrowed copies." In the instance (event) a (non-licensed) copy cannot be "validated", the (non-licensed) user will be given the option of purchasing a license and then provided the passcode to continue. In the event the user cannot verify the passcode, the template will stop functioning after giving the user a number of opportunities to comply.

In one preferred and non-limiting embodiment, a team management tool may be provided. The team management tool may be configured to facilitate the task of assigning team members to current projects and managing when these projects will be complete. The current and/or future projects are defined by users in order to determine when a project will be complete, including inputted information such as, but not limited to, total man hours to complete the project, the project start date, and/or the project deadline. Users may also define the team members that are to be managed. For each team member, users may specify attributes such as, but not limited to, team member work schedules (e.g., how many hours are worked and on which days of the week), and which projects the team members are (or will be) working on.

Within the team management tool, users may define the priority of the tasks each team member is working on. Optionally, users can specify multiple tasks at the same priority level and specify how the team member will divide their work across these tasks. For example, one team member may allot 70% of their time to one project and 30% to another task.

Once this information is entered, the tool may be configured to present the user with graphical representations of project timelines and their estimated completion dates. It will be appreciated that various graphical representations may be used, such as timelines, graphs, charts, reports, and/or the like. The tool will also generate graphical representations of which team members are working together, as well as which team members are not currently assigned to any projects. These representations will allow the user to better manage his or her team and ensure that projects are completed in a timely fashion. The team management tool will also allow the user to send updates to team members relating to project progress and changes to the projects that the team members are working on.

Figure 12:
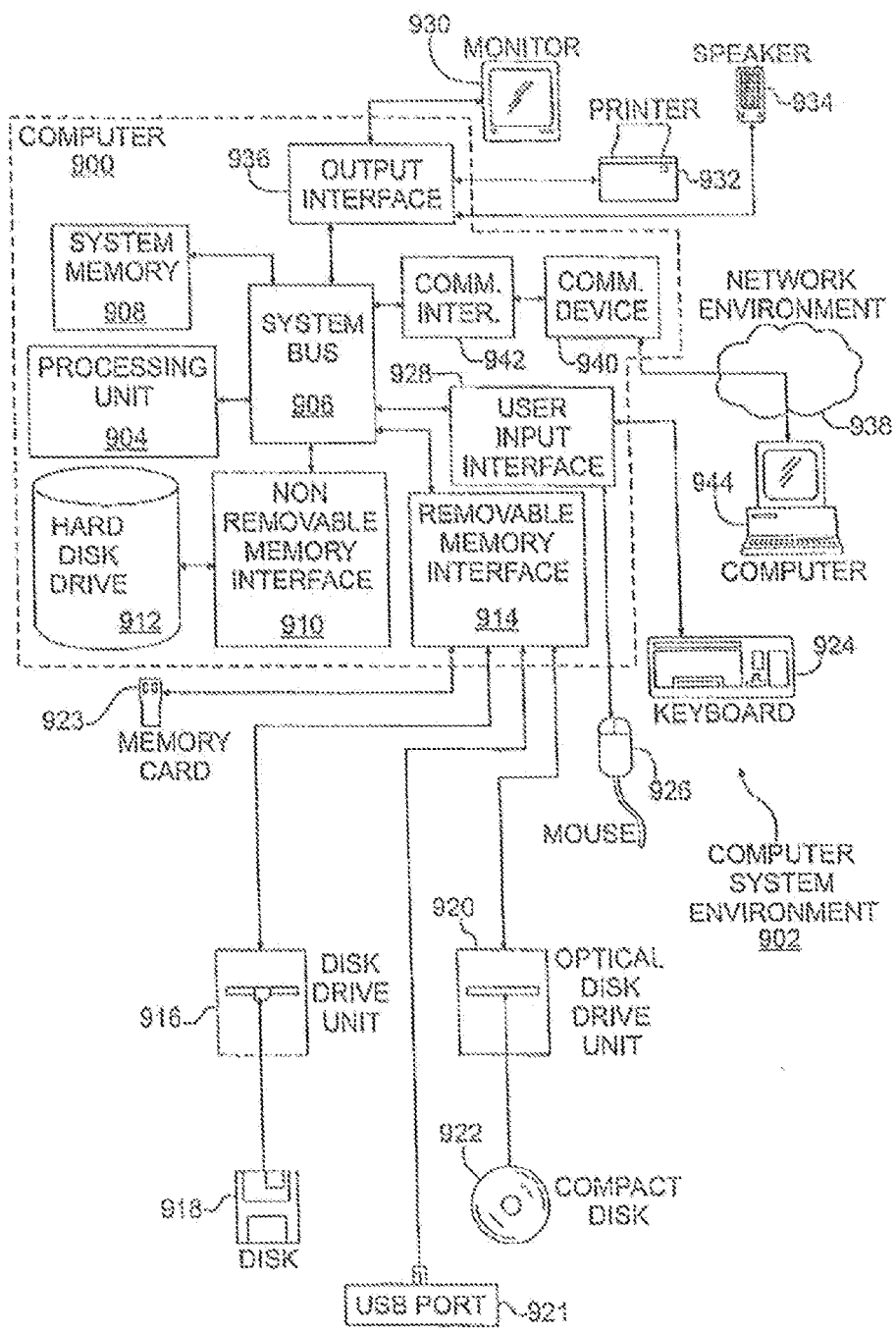
FIG. 12 illustrates a block diagram of the computer system of a data processing system according to the principles of the present invention.

The present invention may be implemented on a variety of computing devices and systems, wherein these computing devices include the appropriate processing mechanisms and computer-readable media for storing and executing computer-readable instructions, such as programming instructions, code, and the like. As shown in FIG. 12, personal computers 900, 944, in a computing system environment 902 are provided. This computing system environment 902 may include, but is not limited to, at least one computer 900 having certain components for appropriate operation, execution of code, and creation and communication of data. For example, the computer 900 includes a processing unit 904 (typically referred to as a central processing unit or CPU) that serves to execute computer-based instructions received in the appropriate data form and format. Further, this processing unit 904 may be in the form of multiple processors executing code in series, in parallel, or in any other manner for appropriate implementation of the computer-based instructions.

In order to facilitate appropriate data communication and processing information between the various components of the computer 900, a system bus 906 is utilized. The system bus 906 may be any of several types of bus structures, including a memory bus or memory controller, a peripheral bus, or a local bus using any of a variety of bus architectures. In particular, the system bus 906 facilitates data and information communication between the various components (whether internal or external to the computer 900) through a variety of interfaces, as discussed hereinafter.

The computer 900 may include a variety of discrete computer-readable media components. For example, this computer-readable media may include any media that can be accessed by the computer 900, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in a modulated data signal, such as a carrier wave or other transport mechanism and include any information delivery media, wired media (such as a wired network and a direct-wired connection), and wireless media (such as acoustic signals, radio frequency signals, optical signals, infrared signals, biometric signals, bar code signals, etc.). Of course, combinations of any of the above should also be included within the scope of computer-readable media.

The computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory 908 typically contains data and program modules that are immediately accessible to or presently being operated on by processing unit 904, e.g., an operating system, application programming interfaces, application programs, program modules, program data and other instruction-based computer-readable codes.

With continued reference to FIG. 12, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. However, it is envisioned that other removable or non-removable, volatile or non-volatile computer storage media can be used in the exemplary computing system environment 900, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 12 provide storage of operating systems, computer-readable instructions, application programs, data structures, program modules, program data and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 902 to execute, configure or otherwise implement the methods, processes, and transformational data manipulations discussed hereinafter in connection with the present invention. Still further, the computer 900 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

Computer 944 represents one or more work stations appearing outside the local network and bidders and sellers machines. The bidders and sellers interact with computer 900, which can be an exchange system of logically integrated components including a database server and web server. In addition, secure exchange can take place through the Internet using secure www. An e-mail server can reside on system computer 900 or a component thereof. Electronic data interchanges can be transacted through networks connecting computer 900 and computer 944. Third party vendors represented by computer 944 can connect using EDI or www, but other protocols known to one skilled in the art to connect computers could be used.

The exchange system can be a typical web server running a process to respond to HTTP requests from remote browsers on computer 944. Through HTTP, the exchange system can provide the user interface graphics.

It will be apparent to one skilled in the relevant art(s) that the system may utilize databases physically located on one or more computers which may or may not be the same as their respective servers. For example, programming software on computer 900 can control a database physically stored on a separate processor of the network or otherwise.

Figure 13:
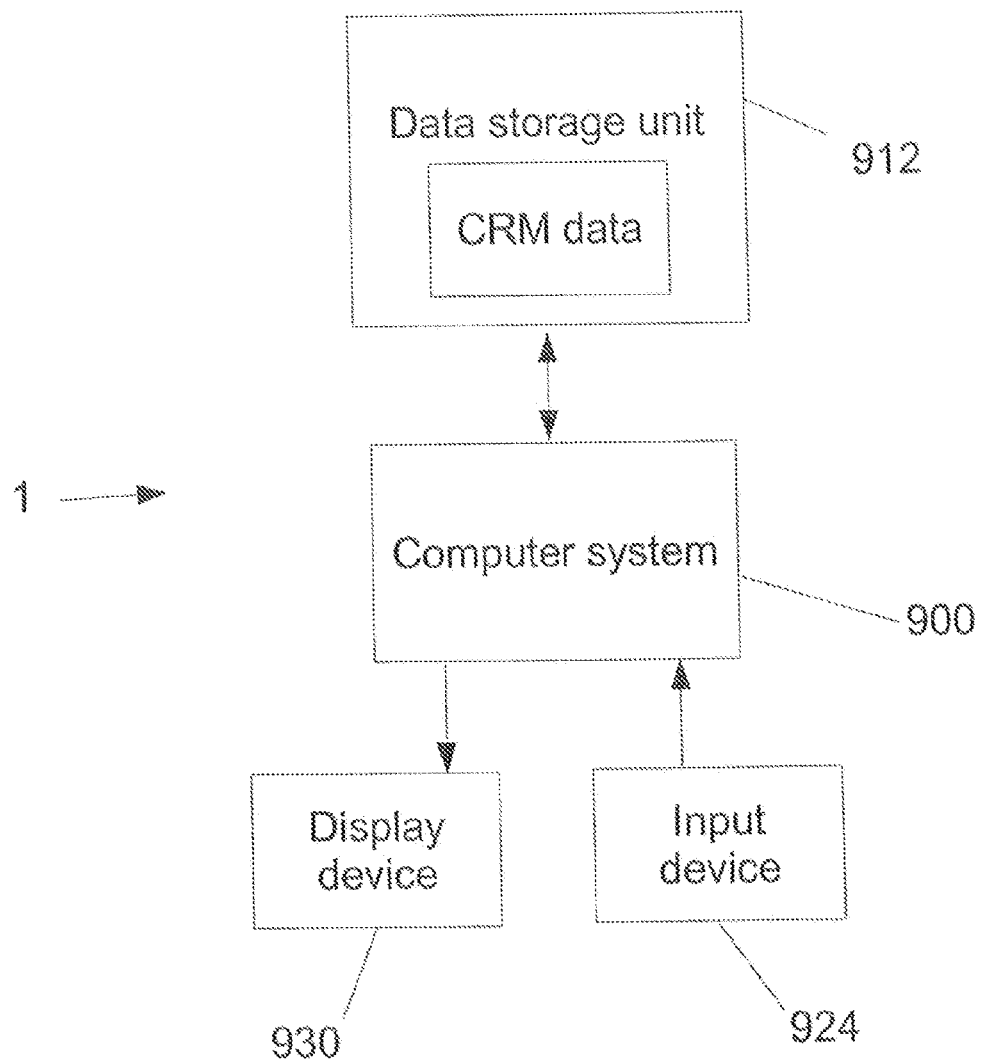
FIG. 13 illustrates a block diagram of a system for a data processing system according to the principles of the present invention.

Referring now to FIG. 13, a data management system 1 is shown according to a preferred and non-limiting embodiment. A computer 900 is in communication with a display device 930, an input device 924, and a data storage unit 912, such as a hard disk drive. The data storage unit includes CRM data for use with the system, although it will be appreciated that other management data may be used.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A data management system operating within a third-party spreadsheet application environment, comprising:
   a plurality of template worksheets within the third-party spreadsheet application, the plurality of template worksheets comprising at least a dashboard interface worksheet; and
   at least one settings interface, generated by at least one processor, comprising at least one worksheet within the third-party spreadsheet application, the at least one settings interface further comprising a plurality of selectable settings options configured to modify at least one parameter of the dashboard interface worksheet,
   the dashboard interface worksheet comprising a master worksheet, generated by at least one processor, comprising a sort option not provided by the third-party spreadsheet application, the sort option configured to: determine a column of a currently selected cell in the master worksheet, sort the column based on a function not provided by the third-party spreadsheet application, and add a selected sort to a list of currently active sorts,
   wherein the dashboard interface worksheet comprises a plurality of selectable dashboard options that are not part of the third-party spreadsheet application, the plurality of selectable dashboard options comprising the sort option comprising at least one of a sort ascending option and a sort descending option.

2. The data management system of claim 1, wherein the plurality of selectable dashboard options comprises an insert contact option, and wherein the insert contact option, when selected, displays an insert contact interface configured to: receive user input comprising contact information, wherein a portion of the contact information is defined by a user; and generating a unique value based at least partially on the contact information.

3. The data management system of claim 2, wherein the unique value is generated by hashing at least a portion of the user input and a current time value obtained from the computer executing the third-party spreadsheet application.

4. The data management system of claim 1, wherein the master worksheet includes a last contact date column and a follow up date column, wherein colors of the last contact date column and the follow up date column are determined by conditional formatting rules set by a user.

5. The data management system of claim 1, wherein the at least one settings interface comprises a return option, the return option configured to display an interface from which the at least one settings interface was accessed.

6. The data management system of claim 1, wherein the dashboard interface worksheet is arranged based at least partially based on the choose columns to display option.

7. A method for managing data within a third-party spreadsheet application environment, comprising:
 importing, into the third-party spreadsheet application environment, a plurality of template worksheets comprising at least a dashboard interface worksheet, and a plurality of software functions not provided with the third-party spreadsheet application, the plurality of software functions comprising a sort option including at least one of a sort ascending option and a sort descending option;
 displaying an add contacts option on at least one template worksheet of the plurality of template worksheets, wherein the add contacts option causes the third-party spreadsheet application to display an add-contacts interface not natively provided by the third-party spreadsheet application;
 receiving, through the add-contacts interface, contact information for a new contact to be added;
 providing a master worksheet comprising the sort option not provided by the third-party spreadsheet application;
 determining, in response to user selection of the sort option, a column of a currently selected cell in the master worksheet;
 sorting the column based on a function not provided by the third-party spreadsheet application; and
 adding a selected sort to a list of currently active sorts.

8. The method of claim 7, wherein the add-contacts interface comprises a template contact worksheet, the method further comprising:
 generating a unique identifier based at least partially on a current time and at least a portion of the contact information;
 generating a unique copy of the template contact worksheet; and
 renaming the copy of the template contact worksheet based at least partially on the unique identifier.

9. The method of claim 8, further comprising:
 displaying a master worksheet comprising a plurality of contacts; and
 automatically inserting a new row comprising a plurality of pointers pointing to data values on the copy of the template contact worksheet.

10. The method of claim 7, further comprising: displaying a settings interface in response to a user selection of a settings option on the dashboard interface worksheet, the settings interface configured to facilitate a user to customize at least three of the following: home page title, user column names, category names, new contact height, new note height, font style, status codes, priority codes, last contact date column color, follow up date column color, or any combination thereof.

11. The method of claim 7, further comprising:
 provide a master worksheet comprising a last contact date column and a follow up date column;
 shading a plurality of cells of the last contact date column with a color, the color determined by a conditional formatting rule set by a user; and
 shading a plurality of cells of the follow up date column with a color, the color determined by a conditional formatting rule set by a user.

12. A computer program product for managing data within a third-party spreadsheet application, the computer program product comprising at least one non-transitory computer readable medium comprising program instructions that, when executed by at least one processor, cause the at least one processor to:
 import, into the third-party spreadsheet application environment, a plurality of template worksheets comprising at least a dashboard interface worksheet, and a plurality of software functions not provided with the third-party spreadsheet application, the plurality of software functions comprising a sort option including at least one of a sort ascending option and a sort descending option;
 display an add contacts option on at least one template worksheet of the plurality of template worksheets, wherein the add contacts option causes the third-party spreadsheet application to display an add-contacts interface not natively provided by the third-party spreadsheet application;
 receive, through the add-contacts interface, contact information for a new contact to be added;
 provide a master worksheet comprising the sort option not provided by the third-party spreadsheet application;
 determine, in response to user selection of the sort option, a column of a currently selected cell in the master worksheet;
 sort the column based on a function not provided by the third-party spreadsheet application; and
 add a selected sort to a list of currently active sorts.

13. The computer program product of claim 12, wherein the add-contacts interface comprises a template contact worksheet, the program instructions further configured to cause the at least one processor to:
 generate a unique identifier based at least partially on a current time and at least a portion of the contact information;
 generate a unique copy of the template contact worksheet; and
 rename the copy of the template contact worksheet based at least partially on the unique identifier.

14. The computer program product of claim 12, the program instructions further configured to cause the at least one processor to:
 display a master worksheet comprising a plurality of contacts; and
 automatically insert a new row comprising a plurality of pointers pointing to data values on the copy of the template contact worksheet.

15. The computer program product of claim 12, the program instructions further configured to cause the at least one processor to: display a settings interface in response to a user selection of a settings option on the dashboard interface worksheet, the settings interface configured to facilitate a user to customize at least three of the following: home page title, user column names, category names, new contact height, new note height, font style, status codes, priority codes, last contact date column color, follow up date column color, or any combination thereof.

16. The computer program product of claim 12, the program instructions further configured to cause the at least one processor to:
 provide a master worksheet comprising a last contact date column and a follow up date column;
 shade a plurality of cells of the last contact date column with a color, the color determined by a conditional formatting rule set by a user; and
 shade a plurality of cells of the follow up date column with a color, the color determined by a conditional formatting rule set by a user, wherein the conditional formatting rule for the color of the last contact date comprises a color to indicate a current date, a color to indicate a specified time period for future reminder, and a color to indicate a past reminder.

* * * * *